(12) United States Patent
Holsgrove

(10) Patent No.: US 12,731,098 B1
(45) Date of Patent: Sep. 8, 2026

(54) METHOD AND SYSTEM FOR REAL-TIME DATA DETERMINATION

(71) Applicant: JPMorgan Chase Bank, N.A., New York, NY (US)

(72) Inventor: Kevin Gerard Holsgrove, Edinburgh (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 119 days.

(21) Appl. No.: 18/679,069

(22) Filed: May 30, 2024

(51) Int. Cl.
*G06Q 10/067* (2023.01)

(52) U.S. Cl.
CPC .................................. *G06Q 10/067* (2013.01)

(58) Field of Classification Search
CPC ............. G06Q 10/067; G06Q 10/0672; G06Q 10/0674
See application file for complete search history.

(56) References Cited

U.S. PATENT DOCUMENTS

2009/0210338 A1* 8/2009 Hor ........................ G06Q 40/04
705/37
2020/0402058 A1* 12/2020 Zhou ......................... G06F 9/54

OTHER PUBLICATIONS

Y. Hang and S. Fong, "Real-time business intelligence system architecture with stream mining," 2010 Fifth International Conference on Digital Information Management (ICDIM), Thunder Bay, ON, Canada, 2010, pp. 29-34, doi: 10.1109/ICDIM.2010.5664637. (Year: 2010).*

* cited by examiner

*Primary Examiner* — George Chen
*Assistant Examiner* — Tayar M Kyu
(74) *Attorney, Agent, or Firm* — Greenblum & Bernstein, P.L.C.

(57) ABSTRACT

A method for automatically providing real-time data determination is disclosed. The method includes detecting, in real-time, an indication of an action from a data stream, the indication including a corresponding transaction record; parsing the transaction record to identify characteristics of the action; retrieving, from sources, reference data that relates to the action based on the corresponding characteristics; initializing a distributed computing environment; asynchronously determining, in real-time via the distributed computing environment, parameters based on the reference data, the characteristics, and the transaction record; and computing, in real-time, projections for the action based on the parameters, the projections including a potential impact of the action.

20 Claims, 5 Drawing Sheets

Server Device 204(1)
Database 206(1)
Server Device 204(n)
Database 206(n)
Real-Time Data Management and Analytics Device 202
Communication Network(s) 210
200
Client Device 208(1)
Client Device 208(n)

METHOD AND SYSTEM FOR REAL-TIME DATA DETERMINATION

BACKGROUND

1. Field of the Disclosure

This technology generally relates to methods and systems for determining data, and more particularly to methods and systems for automatically providing real-time data determination via asynchronous distributed processing.

2. Background Information

Many business entities provide services by managing user activities such as, for example, trading activities and associated data. Often, these user activities generate large volumes of data that must be processed and analyzed to provide insight for the business entities. Historically, implementations of conventional data management and analytic techniques have resulted in varying degrees of success with respect to providing insightful analytics and visualizations with low latency performance.

One drawback of using the conventional data management and analytic techniques is that in many instances, the data necessary for required analytics are persisted in many different venues and are expansive in quantity. As a result, the required analytics may not be accomplished in a timely manner for the user activities. Additionally, due to previous technological limitations, the required analytics may not be accomplished automatically in real-time using streaming data.

Therefore, there is a need to automatically provide real-time data determination via asynchronous distributed processing to enable calculations and impact projections of user activities with low latency performance.

SUMMARY

The present disclosure, through one or more of its various aspects, embodiments, and/or specific features or sub-components, provides, inter alia, various systems, servers, devices, methods, media, programs, and platforms for automatically providing real-time data determination via asynchronous distributed processing.

According to an aspect of the present disclosure, a method for automatically providing real-time data determination is disclosed. The method is implemented by at least one processor. The method may include detecting, in real-time, an indication of an action from a data stream, the indication may include a corresponding transaction record; parsing the transaction record to identify at least one characteristic of the action; retrieving, from at least one source, reference data that relates to the action based on the corresponding at least one characteristic; initializing a distributed computing environment; asynchronously determining, in real-time via the distributed computing environment, at least one parameter based on the reference data, the at least one characteristic, and the transaction record; and computing, in real-time, at least one projection for the action based on the at least one parameter, the at least one projection may include a potential impact of the action.

In accordance with an exemplary embodiment, the method may further include aggregating information that relates to the action, the at least one parameter, and the at least one projection; generating at least one graphical element that depicts the aggregated information, the at least one graphical element may include a dashboard; and displaying, via a graphical user interface, the at least one graphical element.

In accordance with an exemplary embodiment, the method may further include monitoring at least one event trigger; identifying, based on a result of the monitoring, update information that corresponds to the action, the update information may include at least one updated parameter and at least one updated projection; and updating the at least one graphical element with the update information.

In accordance with an exemplary embodiment, the transaction record may include information that relates to at least one from among a completed transaction and a missed transaction, the missed transaction may correspond to at least one transaction that was not selected from a plurality of transactions.

In accordance with an exemplary embodiment, the reference data may include at least one from among internal data from a first-party source and external data from a third-party source, the reference data may relate to information that augments the transaction record.

In accordance with an exemplary embodiment, the at least one parameter may include at least one from among a profit and loss value, a price value, a size value, a weighted mid-price value, and a simple mid-price value.

In accordance with an exemplary embodiment, to compute the at least one projection, the method may further include receiving, via a graphical user interface, at least one data aggregation request, the at least one data aggregation request may include at least one attribute and at least one timeframe; and determining, in real-time by using at least one model, the potential impact of the action according to the at least one attribute.

In accordance with an exemplary embodiment, the at least one attribute may relate to a pricing tier, the at least one attribute may include at least one from among a client tier attribute, an instrument attribute, and an exchange attribute.

In accordance with an exemplary embodiment, the method may further include determining, in real-time by using the at least one model, the potential impact of the action according to the at least one attribute for each of the at least one timeframe, wherein the at least one timeframe may relate to a period of time for the action to occur; and wherein the potential impact may be continuously determined for each of the at least one timeframe.

According to an aspect of the present disclosure, a computing device configured to implement an execution of a method for automatically providing real-time data determination is disclosed. The computing device including a processor; a memory; and a communication interface coupled to each of the processor and the memory, wherein the processor may be configured to detect, in real-time, an indication of an action from a data stream, the indication may include a corresponding transaction record; parse the transaction record to identify at least one characteristic of the action; retrieve, from at least one source, reference data that relates to the action based on the corresponding at least one characteristic; initialize a distributed computing environment; asynchronously determine, in real-time via the distributed computing environment, at least one parameter based on the reference data, the at least one characteristic, and the transaction record; and compute, in real-time, at least one projection for the action based on the at least one parameter, the at least one projection may include a potential impact of the action.

In accordance with an exemplary embodiment, the processor may be further configured to aggregate information that relates to the action, the at least one parameter, and the at least one projection; generate at least one graphical element that depicts the aggregated information, the at least one graphical element may include a dashboard; and display, via a graphical user interface, the at least one graphical element.

In accordance with an exemplary embodiment, the processor may be further configured to monitor at least one event trigger; identify, based on a result of the monitoring, update information that corresponds to the action, the update information may include at least one updated parameter and at least one updated projection; and update the at least one graphical element with the update information.

In accordance with an exemplary embodiment, the transaction record may include information that relates to at least one from among a completed transaction and a missed transaction, the missed transaction may correspond to at least one transaction that was not selected from a plurality of transactions.

In accordance with an exemplary embodiment, the reference data may include at least one from among internal data from a first-party source and external data from a third-party source, the reference data may relate to information that augments the transaction record.

In accordance with an exemplary embodiment, the at least one parameter may include at least one from among a profit and loss value, a price value, a size value, a weighted mid-price value, and a simple mid-price value.

In accordance with an exemplary embodiment, to compute the at least one projection, the processor may be further configured to receive, via a graphical user interface, at least one data aggregation request, the at least one data aggregation request may include at least one attribute and at least one timeframe; and determine, in real-time by using at least one model, the potential impact of the action according to the at least one attribute.

In accordance with an exemplary embodiment, the at least one attribute may relate to a pricing tier, the at least one attribute may include at least one from among a client tier attribute, an instrument attribute, and an exchange attribute.

In accordance with an exemplary embodiment, the processor may be further configured to determine, in real-time by using the at least one model, the potential impact of the action according to the at least one attribute for each of the at least one timeframe, wherein the at least one timeframe may relate to a period of time for the action to occur; and wherein the potential impact may be continuously determined for each of the at least one timeframe.

According to an aspect of the present disclosure, a non-transitory computer readable storage medium storing instructions for automatically providing real-time data determination is disclosed. The storage medium including executable code which, when executed by a processor, may cause the processor to detect, in real-time, an indication of an action from a data stream, the indication may include a corresponding transaction record; parse the transaction record to identify at least one characteristic of the action; retrieve, from at least one source, reference data that relates to the action based on the corresponding at least one characteristic; initialize a distributed computing environment; asynchronously determine, in real-time via the distributed computing environment, at least one parameter based on the reference data, the at least one characteristic, and the transaction record; and compute, in real-time, at least one projection for the action based on the at least one parameter, the at least one projection may include a potential impact of the action.

In accordance with an exemplary embodiment, when executed by the processor, the executable code may further cause the processor to aggregate information that relates to the action, the at least one parameter, and the at least one projection; generate at least one graphical element that depicts the aggregated information, the at least one graphical element may include a dashboard; and display, via a graphical user interface, the at least one graphical element.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
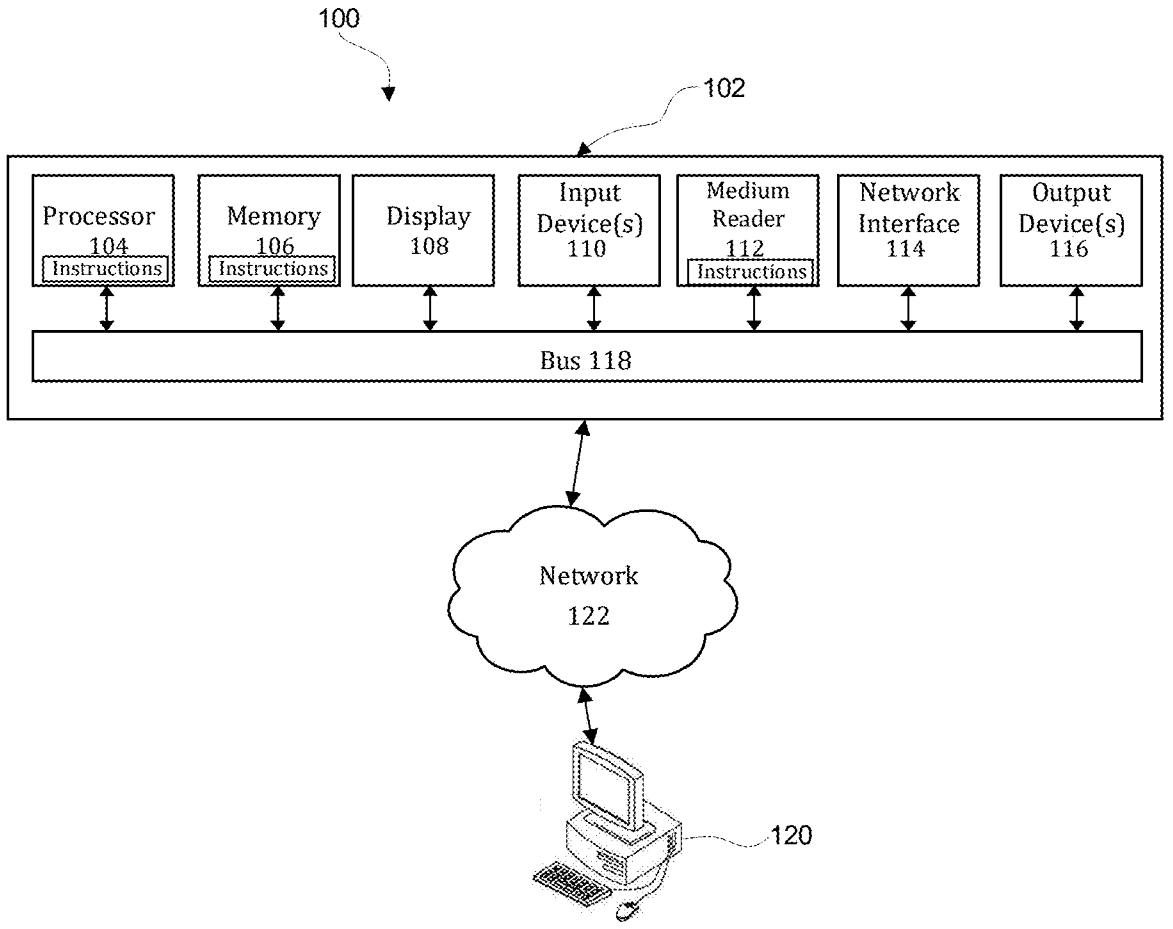
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically providing real-time data determination via asynchronous distributed processing.

Figure 2:
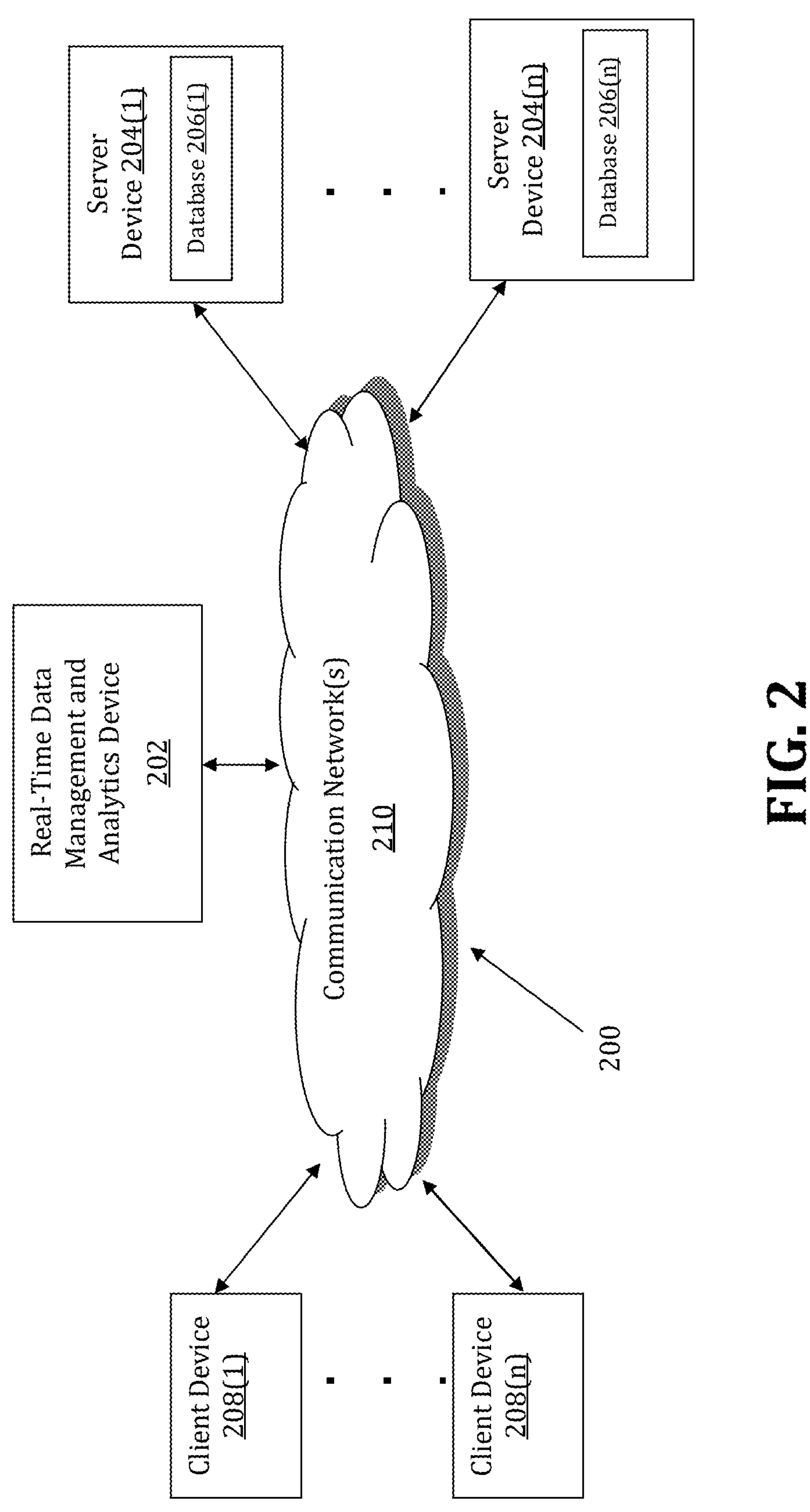
FIG. 2 illustrates an exemplary diagram of a network environment.

Referring to FIG. 2, a schematic of an exemplary network environment 200 for implementing a method for automatically providing real-time data determination via asynchronous distributed processing is illustrated. In an exemplary embodiment, the method is executable on any networked computer platform, such as, for example, a personal computer (PC).

The method for automatically providing real-time data determination via asynchronous distributed processing may be implemented by a Real-Time Data Management and Analytics (RTDMA) device 202. The RTDMA device 202 may be the same or similar to the computer system 102 as described with respect to FIG. 1. The RTDMA device 202 may store one or more applications that can include executable instructions that, when executed by the RTDMA device 202, cause the RTDMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTDMA device 202 itself, may be located in virtual server(s) running in a cloud-based computing environment rather than being tied to one or more specific physical network computing devices. Also, the application(s) may be running in one or more virtual machines (VMs) executing on the RTDMA device 202. Additionally, in one or more embodiments of this technology, virtual machine(s) running on the RTDMA device 202 may be managed or supervised by a hypervisor.

In the network environment 200 of FIG. 2, the RTDMA device 202 is coupled to a plurality of server devices 204(1)-**204(*n*) that hosts a plurality of databases 206(1)-206(*n*), and also to a plurality of client devices 208(1)-208(*n*) via communication network(s) 210. A communication interface of the RTDMA device 202, such as the network interface 114 of the computer system 102 of FIG. 1, operatively couples and communicates between the RTDMA device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RTDMA device 202, the server devices 204(1)-**204(*n*), and/or the client devices 208(1)-208(*n*) may be coupled together via other topologies. Additionally, the network environment 200** may include other network devices such as one or more routers and/or switches, for example, which are well known in the art and thus will not be described herein. This technology provides a number of advantages including methods, non-transitory computer readable media, and RTDMA devices that efficiently implement a method for automatically providing real-time data determination via asynchronous distributed processing.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RTDMA device 202 may be a standalone device or integrated with one or more other devices or apparatuses, such as one or more of the server devices 204(1)-**204(*n*), for example. In one particular example, the RTDMA device 202 may include or be hosted by one of the server devices 204(1)-204(*n*), and other arrangements are also possible. Moreover, one or more of the devices of the RTDMA device 202** may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RTDMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to indications, actions, data streams, transaction records, characteristics, reference data, parameters, projections, and potential impacts.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the RTDMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the RTDMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the RTDMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTDMA device 202, the server devices 204(1)-204(n), or the client devices 208(1)-208(n), for example, may be configured to operate as virtual instances on the same physical machine. In other words, one or more of the RTDMA device 202, the server devices 204(1)-204(n), or the client devices 208(1)-208(n) may operate on the same physical device rather than as separate devices communicating through communication network(s) 210. Additionally, there may be more or fewer RTDMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
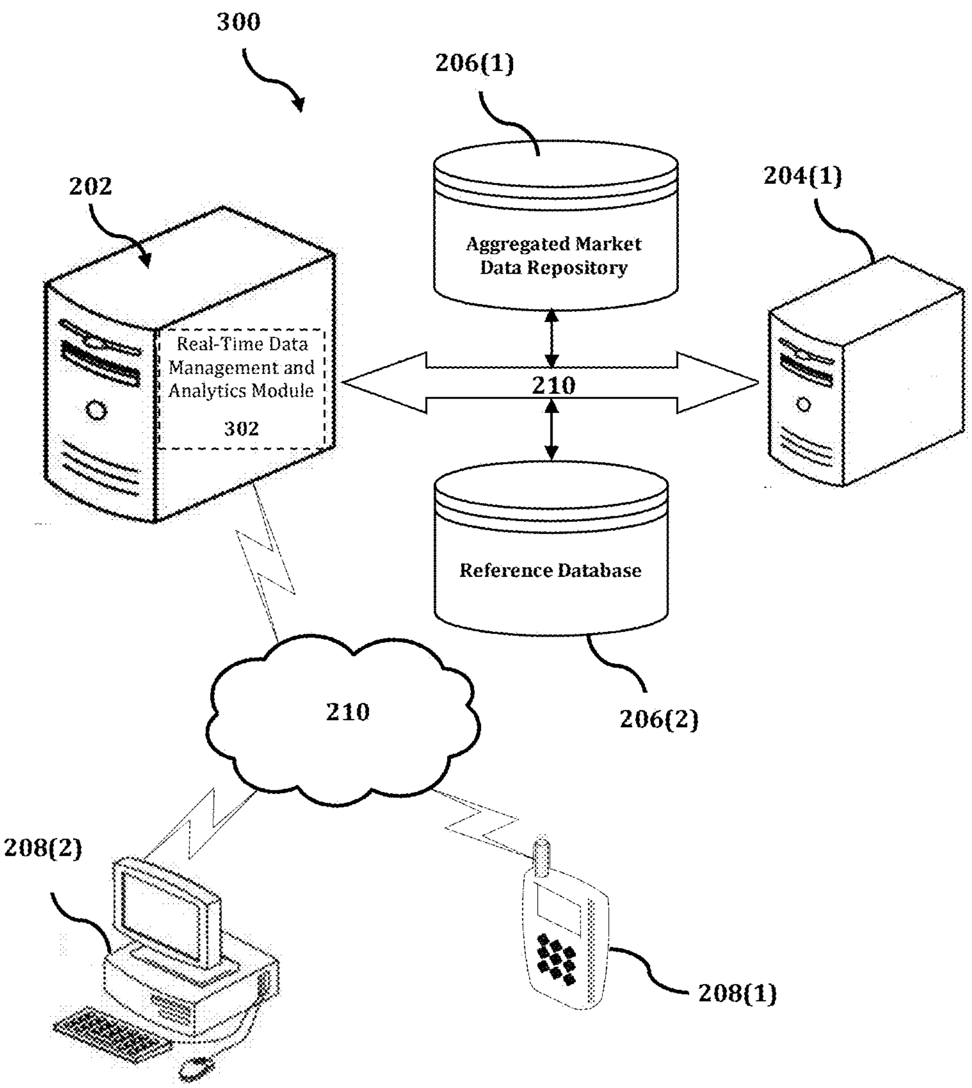
FIG. 3 shows an exemplary system for implementing a method for automatically providing real-time data determination via asynchronous distributed processing.

The RTDMA device 202 is described and shown in FIG. 3 as including a real-time data management and analytics module 302, although it may include other rules, policies, modules, databases, or applications, for example. As will be described below, the real-time data management and analytics module 302 is configured to implement a method for automatically providing real-time data determination via asynchronous distributed processing.

An exemplary process 300 for implementing a mechanism for automatically providing real-time data determination via asynchronous distributed processing by utilizing the network environment of FIG. 2 is shown as being executed in FIG. 3. Specifically, a first client device 208(1) and a second client device 208(2) are illustrated as being in communication with RTDMA device 202. In this regard, the first client device 208(1) and the second client device 208(2) may be "clients" of the RTDMA device 202 and are described herein as such. Nevertheless, it is to be known and understood that the first client device 208(1) and/or the second client device 208(2) need not necessarily be "clients" of the RTDMA device 202, or any entity described in association therewith herein. Any additional or alternative relationship may exist between either or both of the first client device 208(1) and the second client device 208(2) and the RTDMA device 202, or no relationship may exist.

Further, RTDMA device 202 is illustrated as being able to access an aggregated market data repository 206(1) and a reference database 206(2). The real-time data management and analytics module 302 may be configured to access these databases for implementing a method for automatically providing real-time data determination via asynchronous distributed processing.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the RTDMA device 202 via broadband or cellular communication. Of course, these embodiments are merely exemplary and are not limiting or exhaustive.

Upon being started, the real-time data management and analytics module 302 executes a process for automatically providing real-time data determination via asynchronous distributed processing. An exemplary process for automatically providing real-time data determination via asynchronous distributed processing is generally indicated at flowchart 400 in FIG. 4.

Figure 4:
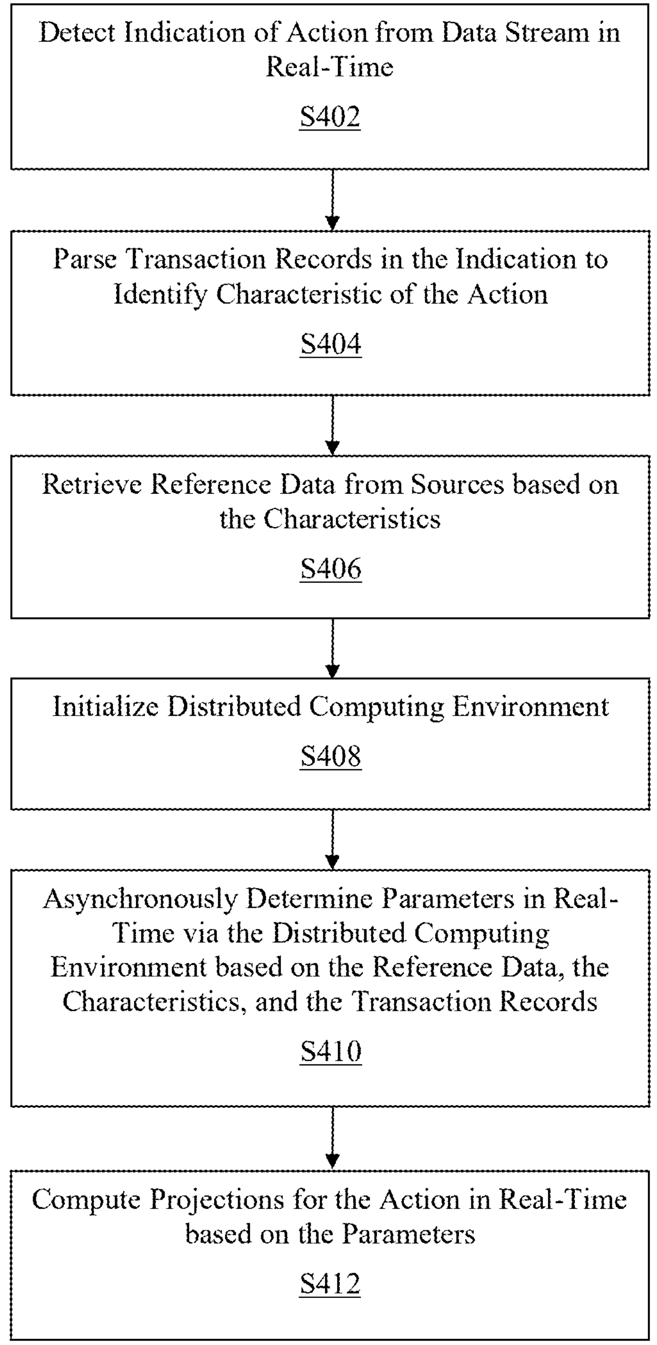
FIG. 4 is a flowchart of an exemplary process for implementing a method for automatically providing real-time data determination via asynchronous distributed processing.

In the process 400 of FIG. 4, at step S402, an indication of an action may be detected from a data stream. The indication may be detected from the data stream in real-time. In an exemplary embodiment, the indication may relate to a piece of information that signals the action and may include a corresponding transaction record. The transaction record may include information that relates to at least one from among a completed transaction and a missed transaction.

In another exemplary embodiment, the completed transaction may correspond to an initiated transaction that has been specifically selected by a user. For example, a user may select transaction X for instrument Y based on a desired result of the selected transaction. In another exemplary embodiment, the missed transaction may correspond to a transaction that was not selected by the user from amongst a plurality of transactions. For example, the missed transaction may relate to a transaction that was not completed because it was not selected by the user.

In another exemplary embodiment, the action may correspond to a user activity such as, for example, a user trade activity. The user activity may be performed by the user via interactions with various connected platforms as well as applications that facilitate the action. The trade activity may relate to a transaction by the user for various assets such as, for example, financial instruments. In another exemplary embodiment, the data stream may relate to the transmission of a sequence of digitally encoded signals to convey information. The data stream may result from the transmission of a continuous flow of data between computing elements such as, for example, applications.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the transaction record may be parsed to identify characteristics of the action. In an exemplary embodiment, the characteristics of the action may include a feature and/or a quality that belongs to the action. For example, the characteristic of an action that is associated with a transaction may include the involved parties and the exchanged instrument. In another exemplary embodiment, the characteristic of the action may include information that is usable to identify and contextualize the action. For example, the characteristic may include an identifier such as a stock symbol that is usable to identify the exchanged instrument. Similarly, the characteristic may include transaction constraints such as regulatory requirements that are usable to contextualize the action.

In another exemplary embodiment, the parsing process may relate to an analysis of the transaction record. The transaction record may be divided into logical syntactic components to facilitate identification and extraction of the characteristics. In another exemplary embodiment, the parsing process may be facilitated by using natural language processing techniques. The natural language processing techniques may be usable to identify and extract the characteristics from transaction records that are in a natural language format.

At step S406, reference data that relates to the action may be retrieved from various sources. The reference data may be retrieved based on the corresponding characteristics. In an exemplary embodiment, the reference data may include at least one from among internal data from a first-party source and external data from a third-party source. The reference data may relate to information that augments the transaction record.

In another exemplary embodiment, the reference data may include market data that contextualizes the action as it relates to a public market. For example, the reference data may include market data that corresponds to a trade action that illustrates a current state of the market when the trade was initiated. In another exemplary embodiment, the reference data may include market data that are usable to project a potential impact of the action. For example, the reference data may include dependency data between various financial instruments that are usable to identify a potential impact of a transaction involving one of the financial instruments.

In another exemplary embodiment, the reference data and the market data may be associated with the action and persisted in a repository. The repository may include a column-based relational time series database with in-memory abilities. The repository may be usable to facilitate the storing, analyzing, processing, and retrieving of large data sets at high speeds. In another exemplary embodiment, the repository may correspond to a time series database that is usable in an on-prem computing environment, a cloud computing environment, and an edge computing environment. The repository may relate to a high-performance column-oriented database.

At step S408, a distributed computing environment may be initialized. In an exemplary embodiment, the distributed computing environment may relate to a distributed system whose computing components are located on different networked computers. The different networked computers may communicate and coordinate actions by passing messages to one another. The components of a distributed system may interact with one another in order to achieve a common goal. For example, the distributed computing environment may facilitate multiple asynchronous calculations that are distributed over large numbers of different networked computers.

In another exemplary embodiment, initializing the distributed computing environment may include setting values and/or configuring conditions that are appropriate to initiate the asynchronous calculations. The initializing process may be accomplished autonomously without user intervention based on information that relates to the transaction record, the characteristics, and the reference data. The initializing process may be governed by predetermined rules and regulations that are customizable by the user via a graphical user interface.

At step S410, parameters may be asynchronously determined based on the reference data, the characteristics, and the transaction record. The parameters may be asynchronously determined in real-time via the distributed computing environment. In an exemplary embodiment, the parameters may include at least one from among a profit and loss value, a price value, a size value, a weighted mid-price value, and a simple mid-price value. The parameters may relate to measurable factors that characterize the action such as, for example, a profit and loss value that characterizes a user position as a result of a trade action.

At step S412, projections for the action may be computed based on the parameters. The projections may be computed in real-time. In an exemplary embodiment, the projections may include a potential impact of the action. For example, the projections of a user position may relate to a potential impact of a trade action on different price tiers. Consistent with present disclosures, the projections may be calculated by using various predictive techniques.

In another exemplary embodiment, the projections may be computed in response to data aggregation requests. The data aggregation requests may be received via the graphical user interface from a user. For example, the user may interact with the graphical user interface to request aggregation of various feedback data on a number of attributes. The data aggregation request may include the requested attributes and associated timeframes. The attributes may relate to a pricing tier and may include at least one from among a client tier attribute, an instrument attribute, and an exchange attribute. The time frames may relate to a period of time such as, for example, five minutes and/or ten minutes for identification of positions and impacts based on the attributes. Then, the potential impact of the action may be determined according to the attributes. The potential impact of the action may be determined in real-time by using a model.

In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the potential impact of the action may be determined according to the attributes for each of the timeframes. The potential impact may be determined in real-time by using the model. Consistent with present disclosures, the time frames may relate to a period of time such as, for example, five minutes and/or ten minutes for identification of positions and impacts based on the attributes. In another exemplary embodiment, the time-frames may relate to a period of time for the action to occur and the potential impact may be continuously determined for each of the timeframes.

In another exemplary embodiment, information that relates to the action, the parameters, and the projections may be aggregated. Then, a graphical element that depicts the aggregated information may be generated. The graphical element may include a visual representation of data such as, for example, a dashboard that provides at-a-glance views of key performance indicators that are relevant to a particular objective. The dashboards may include an interface that visually represents the various pieces of information as graphical representations such as, for example, tables, charts, and graphs. The generated graphical element may be displayable for a user via a graphical user interface. The graphical user interface may facilitate interactions with the user by receiving inputs from the user.

In another exemplary embodiment, the graphical user interface may correspond to a user interface that allows users to interact with electronic devices. The users may interact with the electronic devices though graphical icons and audio indicators. In another exemplary embodiment, the graphical user interface may include graphical elements such as, for example, windows, icons, and menus that facilitate the carrying out of commands such as, for example, opening, deleting, and moving files. The users may interact with the graphical elements via input devices such as, for example, a mouse and keyboard.

In another exemplary embodiment, event triggers may be monitored. The event triggers may correspond to the action and may be monitored via the data stream. For example, an event trigger of a transaction may include an exchange activity that corresponds to an instrument. Then, update information that corresponds to the action may be identified based on a result of the monitoring. For example, update information may be identified when a result of the monitoring indicates that an event was triggered. The update information may include updated parameters and updated projections. The graphical element may be updated with the update information consistent with present disclosures.

Figure 5:
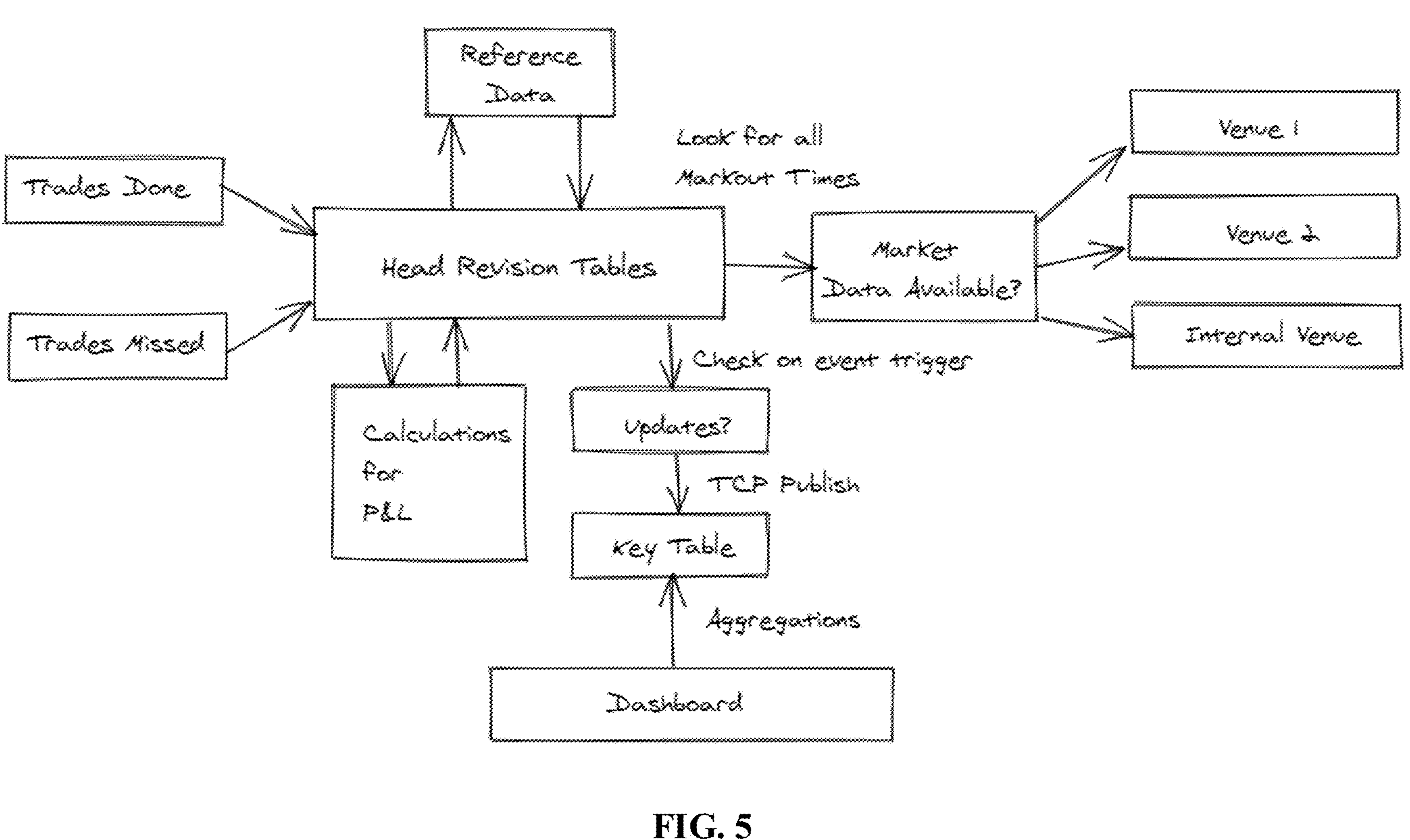
FIG. 5 is a flow diagram of an exemplary process for implementing a method for automatically providing real-time data determination via asynchronous distributed processing.

FIG. 5 is a flow diagram 500 of an exemplary process for implementing a method for automatically providing real-time data determination via asynchronous distributed processing. In FIG. 5, a real-time calculation engine is usable to process large volumes of trade data. The real-time calculation engine may be usable by a user to visibly see positions and the impact of trading of different price tiers. Immediate aggregation may be performed on a number of attributes. The instant feedback may enable the user additional time to react and respond to market conditions. Consistent with present disclosures, mark outs may be continuously calculated for a number of configurable timeframes.

As illustrated in FIG. 5, detected trade records may trigger a number of asynchronous calculations that are distributed over large numbers of processes and/or hardware to provide desired outputs such as, for example, a profit and loss value. The trade records may include information for trades completed as well as information for trades missed.

Then, reference data and market data may be aggregated from various sources for each of the mark out timeframes. The reference data and the market data may facilitate calculations of parameters such as, for example, a profit and loss value. Updates based on event triggers may also be checked prior to publishing the parameters for user consumption via a dashboard. A key table may be usable to ensure that data is accurately published to individual users based on predetermined entitlements and guidelines.

Accordingly, with this technology, an optimized process for automatically providing real-time data determination via asynchronous distributed processing is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically providing real-time data determination, the method being implemented by at least one processor, the method comprising:

detecting, by the at least one processor in real-time, an indication of an action from a data stream, the indication including a corresponding transaction record;

parsing, by the at least one processor, the transaction record to identify at least one characteristic of the action;

retrieving, by the at least one processor from at least one source, reference data that relates to the action based on the corresponding at least one characteristic;

initializing, by the at least one processor, a distributed computing environment;

asynchronously determining, by the at least one processor in real-time via the distributed computing environment, at least one parameter based on the reference data, the at least one characteristic, and the transaction record; and computing, by the at least one processor in real-time, at least one projection for the action based on the at least one parameter, the at least one projection including a potential impact that the action has on different price tiers, wherein the computing of the potential impact utilizes a Markov model machine learning technique to model the randomly changing system of the data stream, and wherein each model that corresponds to the Markov model machine learning technique is generated by utilizing at least one from among an artificial neural network technique, a Bayesian network technique, and a genetic algorithms technique.

2. The method of claim 1, wherein the transaction record includes information that relates to at least one from among a completed transaction and a missed transaction, the missed transaction corresponding to at least one transaction that was not selected from a plurality of transactions.

3. The method of claim 1, wherein the reference data includes at least one from among internal data from a first-party source and external data from a third-party source, the reference data relating to information that augments the transaction record.

4. The method of claim 1, wherein the at least one parameter includes at least one from among a profit and loss value, a price value, a size value, a weighted mid-price value, and a simple mid-price value.

5. The method of claim 1, further comprising:

aggregating, by the at least one processor, information that relates to the action, the at least one parameter, and the at least one projection;

generating, by the at least one processor, at least one graphical element that depicts the aggregated information, the at least one graphical element including a dashboard; and displaying, by the at least one processor via a graphical user interface, the at least one graphical element.

6. The method of claim 5, further comprising:

monitoring, by the at least one processor, at least one event trigger;

identifying, by the at least one processor based on a result of the monitoring, update information that corresponds to the action, the update information including at least one updated parameter and at least one updated projection; and updating, by the at least one processor, the at least one graphical element with the update information.

7. The method of claim 1, wherein computing the at least one projection further comprises:

receiving, by the at least one processor via a graphical user interface, at least one data aggregation request, the at least one data aggregation request including at least one attribute and at least one timeframe; and determining, by the at least one processor in real-time using at least one model, the potential impact of the action according to the at least one attribute.

8. The method of claim 7, wherein the at least one attribute relates to a pricing tier, the at least one attribute including at least one from among a client tier attribute, an instrument attribute, and an exchange attribute.

9. The method of claim 7, further comprising:

determining, by the at least one processor in real-time using the at least one model, the potential impact of the action according to the at least one attribute for each of the at least one timeframe, wherein the at least one timeframe relates to a period of time for the action to occur; and wherein the potential impact is continuously determined for each of the at least one timeframe.

10. A computing device configured to implement an execution of a method for automatically providing real-time data determination, the computing device comprising:

a processor;

a memory; and a communication interface coupled to each of the processor and the memory, wherein the processor is configured to:

detect, in real-time, an indication of an action from a data stream, the indication including a corresponding transaction record;

parse the transaction record to identify at least one characteristic of the action;

retrieve, from at least one source, reference data that relates to the action based on the corresponding at least one characteristic;

initialize a distributed computing environment;

asynchronously determine, in real-time via the distributed computing environment, at least one parameter based on the reference data, the at least one characteristic, and the transaction record; and compute, in real-time, at least one projection for the action based on the at least one parameter, the at least one projection including a potential impact that the action has on different price tiers, wherein the computing of the potential impact utilizes a Markov model machine learning technique to model the randomly changing system of the data stream, and wherein each model that corresponds to the Markov model machine learning technique is generated by utilizing at least one from among an artificial neural network technique, a Bayesian network technique, and a genetic algorithms technique.

11. The computing device of claim 10, wherein the transaction record includes information that relates to at least one from among a completed transaction and a missed transaction, the missed transaction corresponding to at least one transaction that was not selected from a plurality of transactions.

12. The computing device of claim 10, wherein the reference data includes at least one from among internal data from a first-party source and external data from a third-party source, the reference data relating to information that augments the transaction record.

13. The computing device of claim 10, wherein the at least one parameter includes at least one from among a profit and loss value, a price value, a size value, a weighted mid-price value, and a simple mid-price value.

14. The computing device of claim 10, wherein the processor is further configured to:

aggregate information that relates to the action, the at least one parameter, and the at least one projection;

generate at least one graphical element that depicts the aggregated information, the at least one graphical element including a dashboard; and display, via a graphical user interface, the at least one graphical element.

15. The computing device of claim 14, wherein the processor is further configured to:

monitor at least one event trigger;

identify, based on a result of the monitoring, update information that corresponds to the action, the update information including at least one updated parameter and at least one updated projection; and update the at least one graphical element with the update information.

16. The computing device of claim 10, wherein, to compute the at least one projection, the processor is further configured to:

receive, via a graphical user interface, at least one data aggregation request, the at least one data aggregation request including at least one attribute and at least one timeframe; and determine, in real-time by using at least one model, the potential impact of the action according to the at least one attribute.

17. The computing device of claim 16, wherein the at least one attribute relates to a pricing tier, the at least one attribute including at least one from among a client tier attribute, an instrument attribute, and an exchange attribute.

18. The computing device of claim 16, wherein the processor is further configured to:

determine, in real-time by using the at least one model, the potential impact of the action according to the at least one attribute for each of the at least one timeframe, wherein the at least one timeframe relates to a period of time for the action to occur; and wherein the potential impact is continuously determined for each of the at least one timeframe.

19. A non-transitory computer readable storage medium storing instructions for automatically providing real-time data determination, the storage medium comprising executable code which, when executed by a processor, causes the processor to:

detect, in real-time, an indication of an action from a data stream, the indication including a corresponding transaction record;

parse the transaction record to identify at least one characteristic of the action;

retrieve, from at least one source, reference data that relates to the action based on the corresponding at least one characteristic;

initialize a distributed computing environment;

asynchronously determine, in real-time via the distributed computing environment, at least one parameter based on the reference data, the at least one characteristic, and the transaction record; and compute, in real-time, at least one projection for the action based on the at least one parameter, the at least one projection including a potential impact that the action has on different price tiers, wherein the computing of the potential impact utilizes a Markov model machine learning technique to model the randomly changing system of the data stream, and wherein each model that corresponds to the Markov model machine learning technique is generated by utilizing at least one from among an artificial neural network technique, a Bayesian network technique, and a genetic algorithms technique.

20. The storage medium of claim 19, wherein, when executed by the processor, the executable code further causes the processor to:

aggregate information that relates to the action, the at least one parameter, and the at least one projection;

generate at least one graphical element that depicts the aggregated information, the at least one graphical element including a dashboard; and display, via a graphical user interface, the at least one graphical element.

* * * * *